US010762317B2

(12) United States Patent
Fan et al.

(10) Patent No.: US 10,762,317 B2
(45) Date of Patent: Sep. 1, 2020

(54) QUICK RESPONSE (QR) CODE DEFORMATION

(71) Applicant: International Business Machines Corporation, Armonk, NY (US)

(72) Inventors: Hua Wei Fan, Beijing (CN); Lei Wang, Beijing (CN); Zheng Lei An, Beijing (CN); Xin Zhao, Changping District (CN); Hong Wei Sun, Beijing (CN); Ting Yin, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/181,833

(22) Filed: Nov. 6, 2018

(65) Prior Publication Data

US 2020/0143131 A1    May 7, 2020

(51) Int. Cl.
 *G06K 9/36* (2006.01)
 *G06K 7/14* (2006.01)
 *G06K 19/06* (2006.01)

(52) U.S. Cl.
 CPC ......... *G06K 7/1456* (2013.01); *G06K 7/1417* (2013.01); *G06K 19/06037* (2013.01)

(58) Field of Classification Search
 CPC ........... G06K 7/1417; G06K 19/06037; G06K 2007/10534
 USPC .............. 235/462.1, 462.09, 462.25, 462.45, 235/472.01
 See application file for complete search history.

(56) References Cited

U.S. PATENT DOCUMENTS

| 8,494,268 B2 * | 7/2013 | Soderberg ................ G06K 7/14 235/462.08 |
| 2007/0007449 A1 * | 1/2007 | Hubner .............. G01N 21/3504 250/338.1 |
| 2007/0069028 A1 | 3/2007 | Nemet |
| 2015/0302421 A1 * | 10/2015 | Caton .................. G06Q 30/018 705/17 |
| 2016/0048826 A1 * | 2/2016 | Feffernnan ......... G06Q 20/3274 705/23 |

(Continued)

FOREIGN PATENT DOCUMENTS

| CN | 106778434 A | 5/2017 |
| CN | 206849027 U | 1/2018 |

(Continued)

OTHER PUBLICATIONS

Author Anonymous, "Adaptive and Progressive Barcode Reading," ip.com Disclosure No. IPCOM000213479D, Publication Date: Dec. 15, 2011, 1 pg., URL: https://priorart.ip.com/IPCOM/000213479.

*Primary Examiner* — Daniel St Cyr
(74) *Attorney, Agent, or Firm* — Cantor Colburn LLP; Teddi Maranzano

(57) ABSTRACT

Examples of techniques for quick response (QR) code deformation are described herein. An aspect includes receiving a first QR code, wherein the first QR code is scannable by a QR code scanner at a first range of angles. Another aspect includes determining a scanner angle, the scanner angle being outside of the first range of angles. Another aspect includes generating a second QR code based on the first QR code and the scanner angle, wherein the second QR code comprises a deformed QR code that is scannable by the QR code scanner at a second range of angles that is distinct from the first range of angles.

17 Claims, 7 Drawing Sheets

(56) References Cited

U.S. PATENT DOCUMENTS

2016/0224877 A1* 8/2016 Troesch ........... G06K 19/06046
2017/0357884 A1* 12/2017 Friedman ......... G06K 19/06037

FOREIGN PATENT DOCUMENTS

| CN | 107704793 A | 2/2018 |
| CN | 207457915 U | 6/2018 |
| EP | 3217325 A1 | 9/2017 |

* cited by examiner

QUICK RESPONSE (QR) CODE DEFORMATION

BACKGROUND

The present techniques relate to quick response (QR) codes. More specifically, the techniques relate to the generation of deformed QR codes.

Quick Response codes, or QR codes, are used for conveying information in various applications. QR codes are 2-dimensional matrices of black and white squares that function as a two-dimensional bar code, developed to allow high-speed decoding. A QR code can be read by a variety of decoding devices, including dedicated QR code readers, or scanners, and smartphones provided with QR code reader applications. Originally developed for tracking parts during vehicle manufacturing, QR codes may be used for many other purposes. QR code generators are readily available to those who want to generate and print their own codes.

QR codes may be used as a means of communicating with mobile phone users, with links to internet addresses, Uniform Resource Locators (URLs), or any other appropriate information being provided via the QR codes. QR codes may be printed in magazines, or on other physical objects such as signs, buses, business cards, or any object about which a code publisher believes users might need or want information. A user with a mobile computing device, such as a smartphone, that is equipped with a QR code reader application can scan the image of a QR code and decode the scanned image to receive, for example, a URL that will open a mobile web page that displays the content that has been uploaded to the mobile web page, including a link to a text display, an email message, or a link to connect to a wireless network. In a further example, a QR code may be displayed on any type of screen or display to communicate information to a user that is viewing the screen. For example, a television may display a QR code as part of, for example, a program or advertisement, and a user may scan the displayed QR code on the television screen to receive further information. A QR code may also be displayed on a screen of a user's mobile computing device, such as a smartphone, for use as, for example, a ticket to an event, a coupon, or any other appropriate identifier of the user. In such a case, the QR code on the screen of the user's mobile computing device may be scanned using a QR code scanner, and the QR code scanner may determine, for example, whether the user possesses a valid ticket to the event.

SUMMARY

According to an embodiment described herein, a system can include a processor to receive a first QR code, wherein the first QR code is scannable by a QR code scanner at a first range of angles. The processor can also determine a scanner angle, the scanner angle being outside of the first range of angles. The processor can also generate a second QR code based on the first QR code and the scanner angle, wherein the second QR code comprises a deformed QR code that is scannable by the QR code scanner at a second range of angles that is distinct from the first range of angles.

According to another embodiment described herein, a method can include receiving a first QR code, wherein the first QR code is scannable by a QR code scanner at a first range of angles. The method can further include determining a scanner angle, the scanner angle being outside of the first range of angles. The method can further include generating a second QR code based on the first QR code and the scanner angle, wherein the second QR code comprises a deformed QR code that is scannable by the QR code scanner at a second range of angles that is distinct from the first range of angles.

According to another embodiment described herein, a computer program product may include a computer readable storage medium having program instructions embodied therewith, the program instructions executable by a processing device to cause the processing device to perform a method including receiving a first QR code, wherein the first QR code is scannable by a QR code scanner at a first range of angles. The method can further include determining a scanner angle, the scanner angle being outside of the first range of angles. The method can further include generating a second QR code based on the first QR code and the scanner angle, wherein the second QR code comprises a deformed QR code that is scannable by the QR code scanner at a second range of angles that is distinct from the first range of angles.

DETAILED DESCRIPTION

Embodiments of QR code deformation are provided, with exemplary embodiments being discussed below in detail. Embodiments of a QR code are square grids of equally sized pixels. In order to be successfully scanned by a scanner, the scanner should be located at roughly a 90° angle to the surface containing the QR code. When the angle between a QR code and the scanner is beyond a certain degree range, the scanner cannot recognize and scan the QR code. In order to change the range of angles at which a QR code may be successfully scanned, the QR code may be deformed, or scaled, so as to account for an angle to the scanner. For example, in some embodiments, pixels in the QR code that are closer to the scanner at the particular angle may be made smaller, while pixels in the QR code that are farther away from the scanner at the particular angle may be made larger. A scanner may successfully scan the deformed QR code at a different range of angles than is possible for the original, undeformed QR code. In further embodiments, a series of deformed versions of a single QR code may be generated for a plurality of different angles to a scanner, and the series of deformed versions of the QR code may be displayed in an animated loop on a screen as a dynamic QR code, allowing a scanning device to successfully scan the dynamic QR code at a wide range of angles. For a dynamic QR code, the scanner may not need to move to find a position which directly faces the QR code; in some embodiments, a dynamic QR code may be successfully scanned across an angle range of close to 180°. In various embodiments, a deformed QR code may be displayed on any appropriate physical object, such as a poster, business card, shipping box, or piece of paper, or on a computer display.

Figure 1:
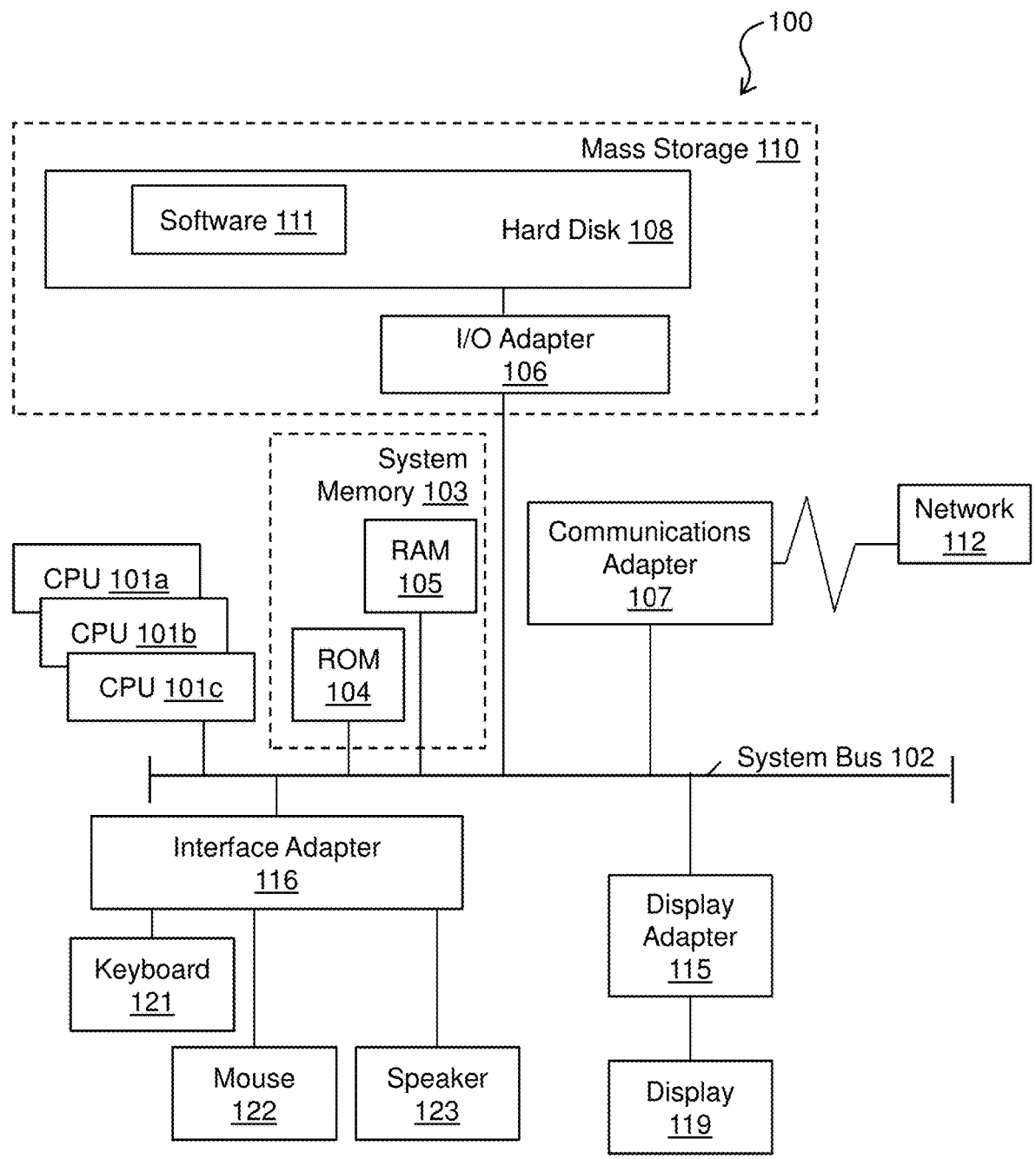
FIG. 1 is a block diagram of an example computer system for QR code deformation.

Turning now to FIG. 1, a computer system 100 is generally shown in accordance with an embodiment. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc. (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system, such as the z/OS or AIX operating system from IBM Corporation, to coordinate the functions of the various components shown in FIG. 1.

Additional input/output devices are shown as connected to the system bus 102 via a display adapter 115 and an interface adapter 116 and. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by a display adapter 115, which may include a graphics controller to improve the performance of graphics intensive applications and a video controller. A keyboard 121, a mouse 122, a speaker 123, etc. can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
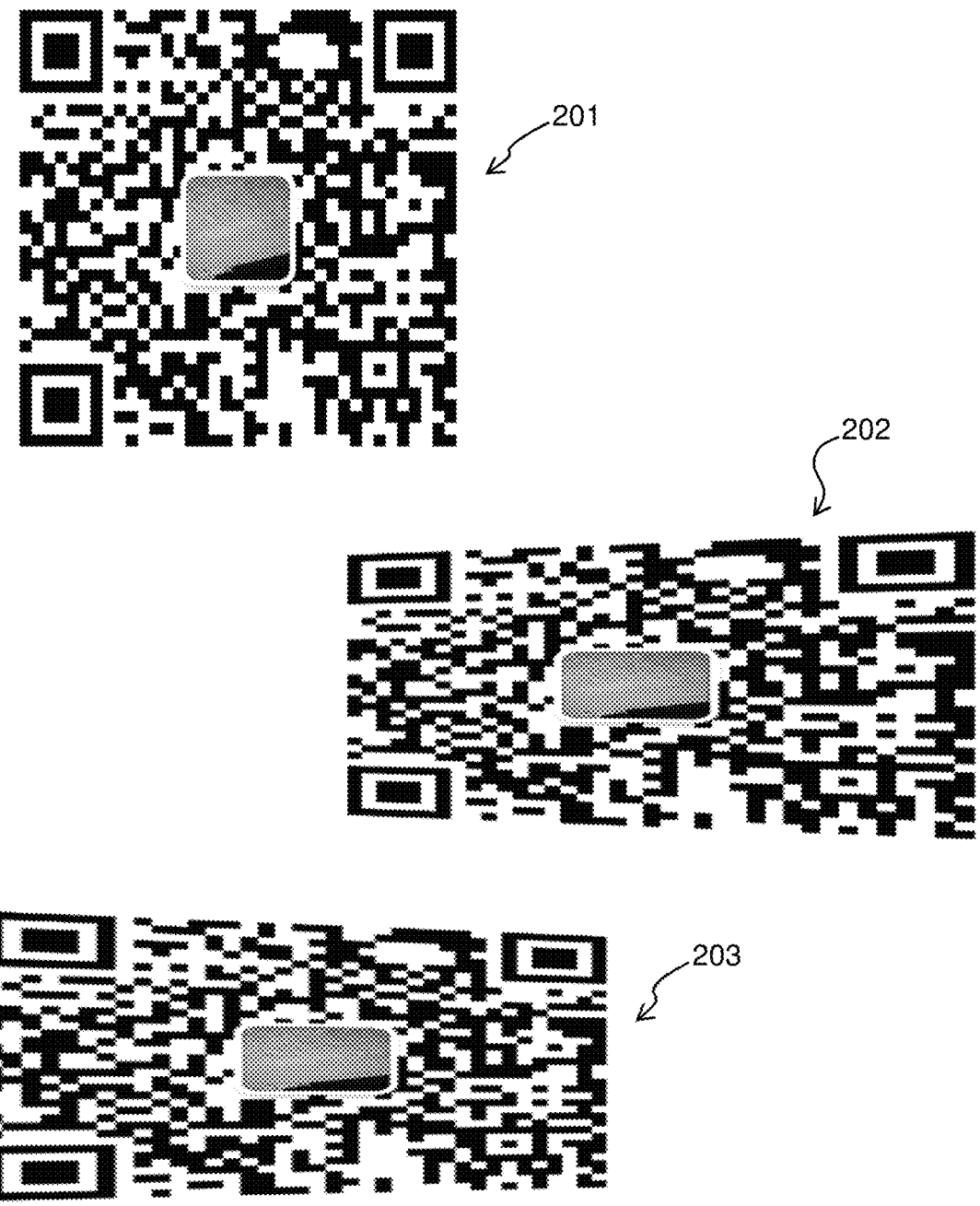
FIG. 2 depicts example embodiments of deformed QR codes.

FIG. 2 depicts example embodiments of deformed QR codes. As shown in FIG. 2, QR code 201 is an example undeformed QR code. A scanner may successfully scan QR code 201 at a limited range of angles that is centered around 90° from a surface containing QR code 201. Deformed QR codes 202 and 203 are generated based on QR code 201, and may be read by a scanner at varying angles. Each of QR codes 201, 202, and 203 convey the same information to a QR code scanner when successfully scanned. QR code 202 is deformed based on an angle to the scanner that is less than 90° in the horizontal direction, and is scannable at a range of angles that is distinct from (e.g., lower than) both QR codes 201 and 203. QR code 203 is deformed based on an angle to the scanner that is greater than 90° in the horizontal direction, and is scannable at a range of angles that is distinct from (e.g., higher than) both QR codes 201 and 202. Each of QR codes 201, 203, and 203 are made of up a grid of pixels. In QR code 201, each of the pixels in the grid are the same size. In order to generate a deformed QR code such as QR codes 202 and 203, the individual pixels in a QR code such as QR code 201 may be scaled to account for a particular angle to a scanner. The scaling may be performed on each individual pixel in both the X and Y directions of the grid in some embodiments; pixels that are closer to the scanner may be made smaller, while pixels that are farther away from the scanner may be made larger. In other embodiments, the scaling may be performed across a single direction (e.g., one of the X direction and the Y direction); in such an embodiment, the pixels in each vertical line in the X direction across the QR code may be scaled together according to the same scaling factor, or the pixels in each horizontal line in the Y direction across the QR code may be scaled together according to the same scaling factor, wherein the scaling factor is determined based on a distance of the line of pixels to the scanner.

QR codes 202 and 203 are shown for illustrative purposes only; a deformed QR code may be generated based on any appropriate angle to the scanner in any direction. Deformed QR codes 202 and 203 may be generated using a computer system 100 as shown in FIG. 1. QR codes 201, 202, and 203 may be displayed on a display 119 as shown in FIG. 1 in some embodiments, in such embodiments, the display 119 may be part of a computer system 100 that is a smartphone device, or any other appropriate type of computing device. In other embodiments a deformed QR code such as is shown in FIG. 2 may be displayed for scanning on any appropriate physical object, including but not limited to a sheet of paper, a poster, a sign, or a shipping box.

Figure 3:
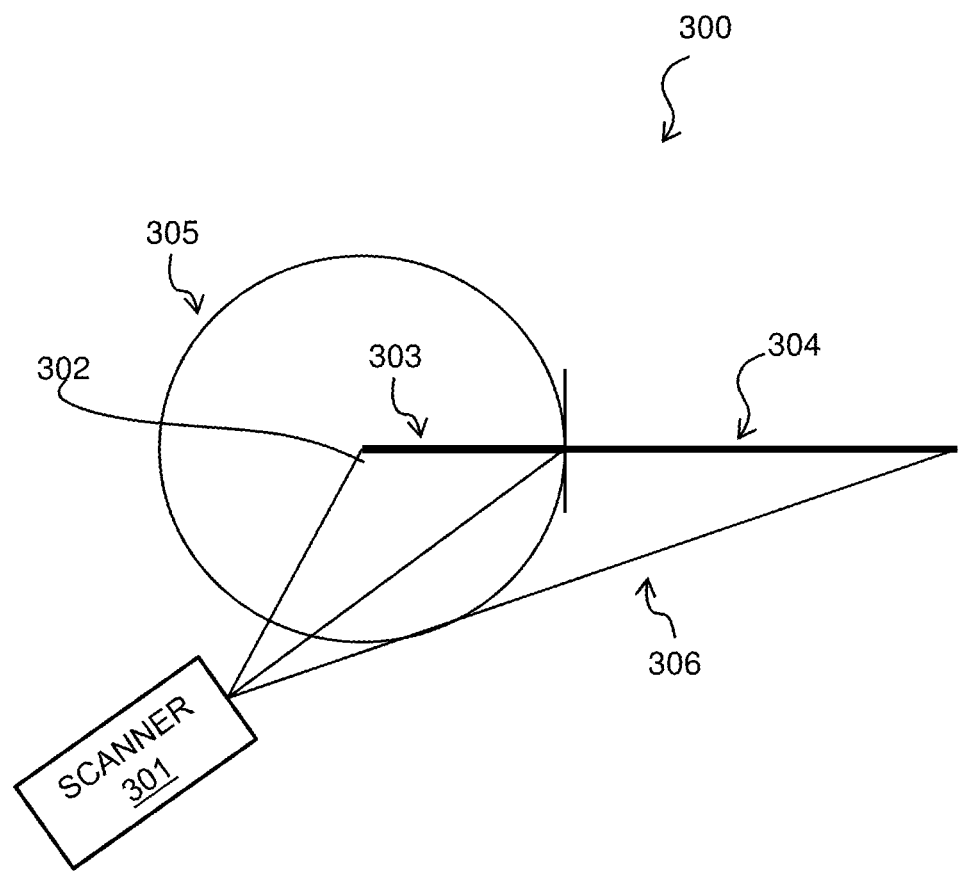
FIG. 3 is a block diagram showing an example of deformed QR code generation.

FIG. 3 is a block diagram showing an example system 300 for deformed QR code generation. System 300 shows a side view of a scanner 301 that is at an angle 302 with respect to a surface containing a QR code 303. Angle 302 is larger than a threshold angle, so that the scanner 301 is not able to successfully scan the QR code 303 due to the angle 302. In order to deform the QR code 303 to account for the angle 302, pixels in the QR code 303 that are closer to the scanner 301 may be made smaller, while pixels in the QR code 303 that are farther away from the scanner 301 may be made larger. In the example system 300 of FIG. 3, a circle 305 having a radius equal to the length of the QR code 303 may be determined, and a line 306 that extends from the scanner 301 that is tangent to the circle 305 may be determined. The intersection of line 306 and the extension of the line comprising the QR code 303 gives a length 304 of a deformed QR code that accounts for the angle 302 to the scanner 301 from QR code 303. The pixels in the QR code 303 may be scaled and mapped onto the longer length 304 to determine a deformed QR code having the length 304, such as deformed QR codes 202 and 203 that were shown in FIG. 2. The system 300 as shown in FIG. 3 only accounts for one direction (i.e. X or Y) across the QR code 303. The system 300 as shown in may determine a length such as length 304 for any type of QR code, in any direction, for any angle from a scanner such as scanner 301 that is at any distance from a QR code. FIG. 3 is shown for illustrative purposes only. A deformed QR code such as is discussed herein may be generated in any appropriate manner.

Figure 4:
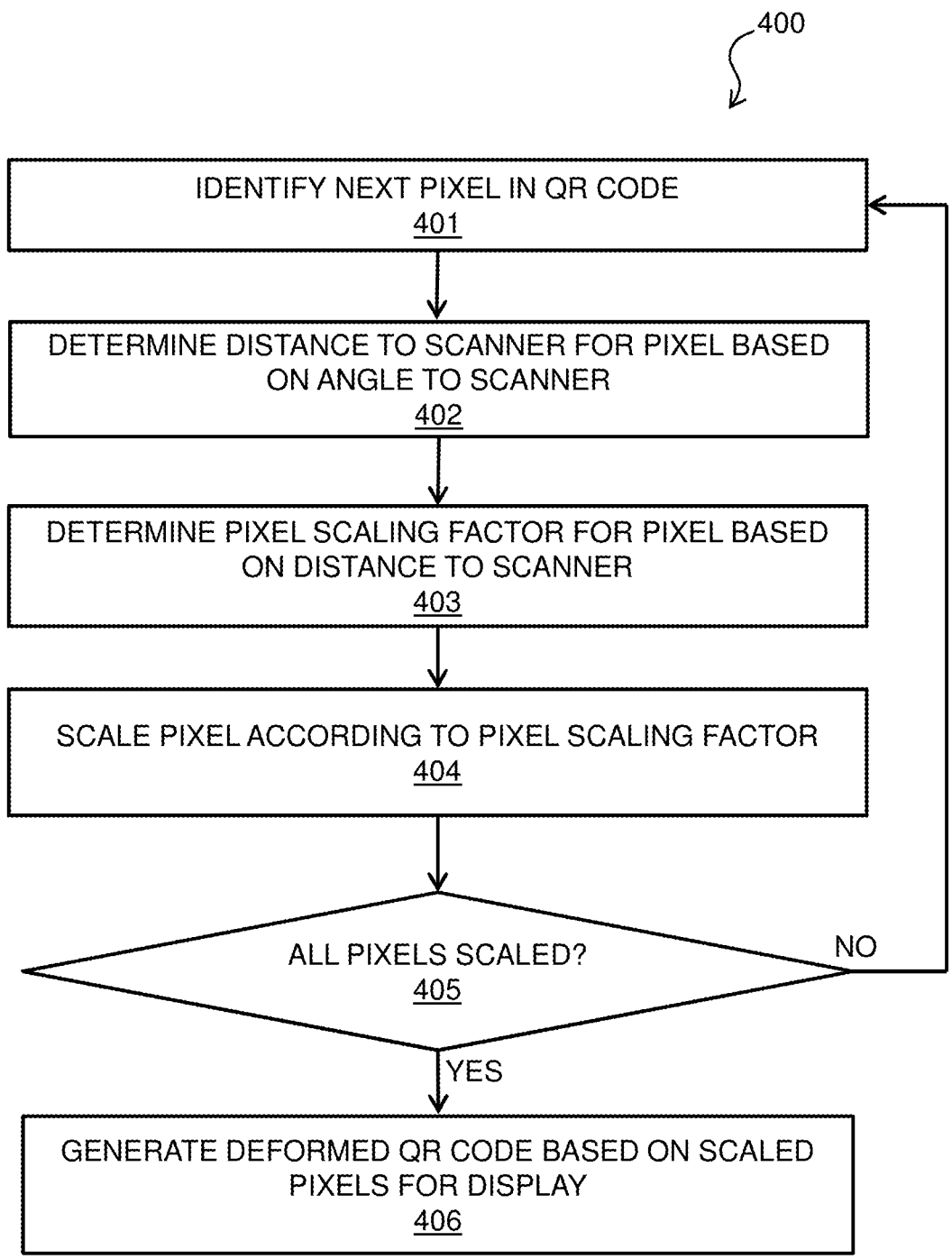
FIG. 4 is a process flow diagram of an example method for deformed QR code generation.

FIG. 4 is a process flow diagram of an example method 400 for deformed QR code generation. The method 400 can be implemented with any suitable computing device, such as the computer system 100 of FIG. 1. In block 401, pixel is identified in the QR code that is being deformed, for example, QR code 201 of FIG. 2. Next, in block 402, a distance from the pixel to the scanner that is based on a particular angle from the QR code to the scanner is determined. The angle may be a predetermined angle that is selected by, for example, a user or process that is generating the deformed QR code. In some embodiments, distance to the scanner may be determined in only one direction (e.g., the X direction or the Y direction), in other embodiments, the distance to the scanner may be determined in both the X and Y directions. In block 403, a pixel scaling factor is determined based on the distance to the scanner that was determined in block 402. For example, for a pixel that is closer to the scanner, the pixel scaling factor may be less than 1, while for a pixel that is farther away from the scanner, the pixel scaling factor may be greater than 1. In block 404, the pixel is scaled according to the pixel scaling factor that was determined in block 403. For example, for a pixel that is closer to the scanner, the pixel may be made smaller, while for a pixel that is farther away from the scanner, the pixel may be made larger. In block 405, it is determined whether all of the pixels in the QR code such as QR code 201 have been scaled based on the predetermined angle. If all the pixels have not been scaled, the flow returns to block 401 from block 405, and a next pixel in the QR code is scaled according to blocks 401-404. Blocks 401 and 404 are performed for each pixel in the QR code. When it is determined in block 405 that all of the pixels in the QR code have been scaled, flow proceeds from block 405 to block 406. In block 406, a deformed QR code, such as deformed QR codes 202 and 203 as shown in FIG. 2, is generated based on the scaled pixels. Because each pixel has been scaled according to the pixel's respective distance to the scanner for the predetermined angle, when it is displayed, the deformed QR code will be scannable for a range of angles corresponding to the predetermined angle that may not be scannable for the original QR code. The scaled pixels of the deformed QR code may further be scaled together, or the individual scaling factors may be selected, so that the deformed QR code has a total length that is determined as was shown above with respect to FIG. 3. The deformed QR code that is generated according to method 400 of FIG. 4 may be displayed for scanning in any appropriate manner, for example, on a computer display such as display 119 of FIG. 1, or on any appropriate physical object.

The process flow diagram of FIG. 4 is not intended to indicate that the operations of the method 400 are to be executed in any particular order, or that all of the operations of the method 400 are to be included in every case. Additionally, the method 400 can include any suitable number of additional operations.

Figure 5:
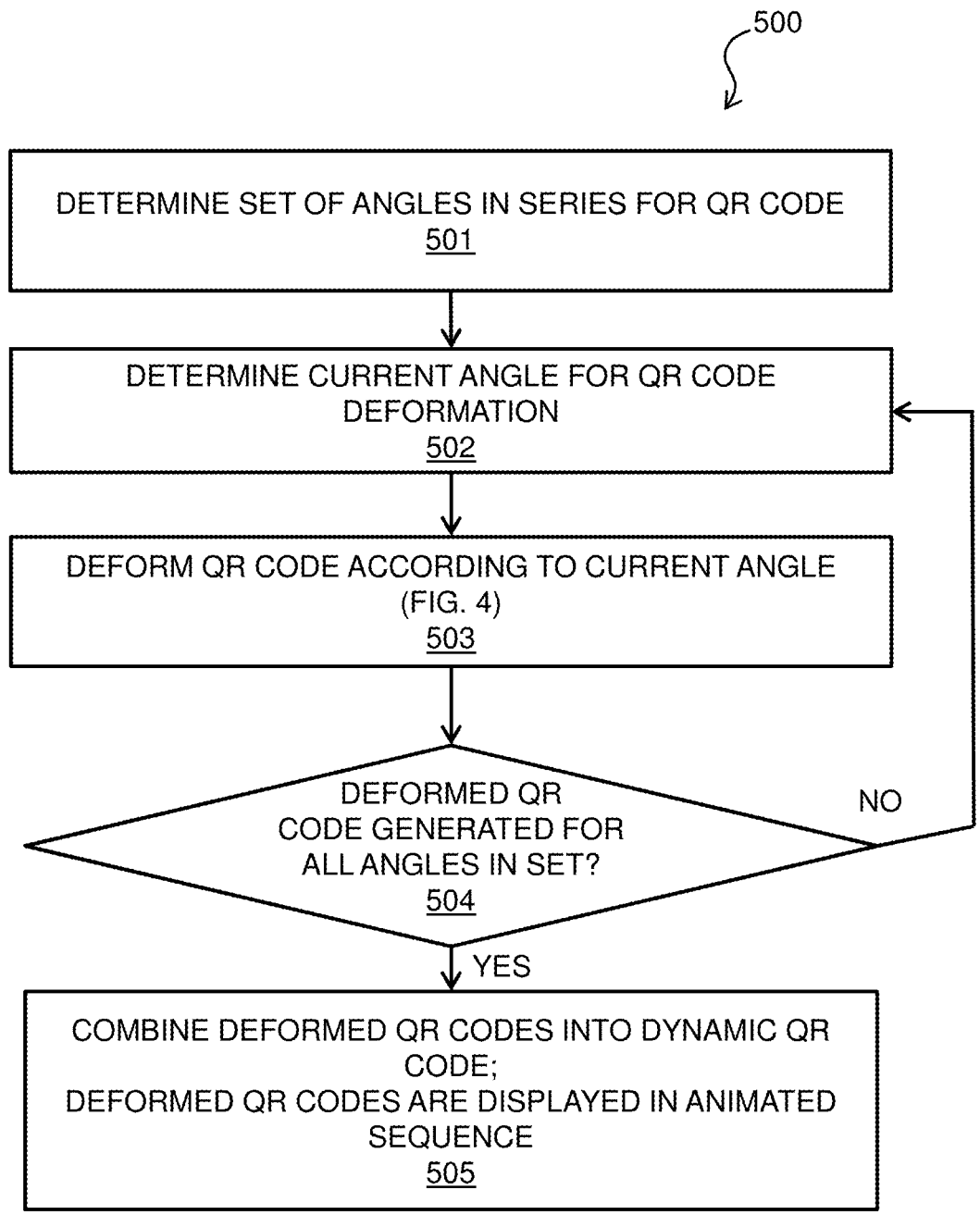
FIG. 5 is a process flow diagram of an example method for dynamic QR code generation including deformed QR codes.

FIG. 5 is a process flow diagram of an example method 500 for deformed QR code generation. The method 500 can be implemented with any suitable computing device, such as the computer system 100 of FIG. 1. Method 500 may be used in conjunction with method 400 of FIG. 4 to generate a dynamic QR code that may be displayed on, for example, a display 119 as shown in FIG. 1. In block 501, a number of QR codes for a dynamic QR code, and a set of angles corresponding to the number of QR codes, is determined. For example, for a dynamic QR code including 5 QR codes, the set of angles may be 30°, 60°, 90°, 120°, and 150°. The 90° angle corresponds to the original QR code, while respective deformed QR codes may be generated for each of the other angles (30°, 60°, 120°, and 150°). In block 502, a current angle is determined for generation of a deformed QR code. In block 503, a deformed QR code is generated according to the current angle. In some embodiments, the deformed QR code may be generated according to method 400 of FIG. 4 in block 503; in such embodiments, the current angle is used in block 402 of FIG. 4 to determine the distance to the scanner. In block 504, it is determined whether deformed QR codes have been generated for each of the angles in the set that was determined in block 501. If it is determined in block 504 that deformed QR codes have not been generated for each of the angles in the set, flow returns to block 502 from block 503, and a next deformed QR code is determined for a next angle in the set. Blocks 502 to 504 are repeated for each angle in the set until it is determined in block 504 that a respective deformed QR code has been generated for each angle in the set. When it is determined that respective deformed QR code has been generated for each angle in the set in block 504, flow proceeds to block 505, in which a dynamic QR code is generated by displaying each of the deformed QR codes in an animated sequence on a display, such as display 119 of FIG. 1. The dynamic QR code may also include the original, undeformed QR code. Displaying of the series of QR codes in the dynamic QR code in the animated sequence may allow a scanner to successfully scan the dynamic QR code at a wide range of angles, as the position of the scanner may correspond to any one (or more) of the deformed QR codes in the dynamic QR code.

Each of the QR codes in the set that makes up a dynamic QR code that is generated according to method 500 of FIG. 5 is scannable across a range of angles that is centered around the angle that was used to generate the QR code (i.e., the current angle of blocks 502-503). The respective ranges of scannable angles of the various QR codes in a dynamic QR code may overlap in some embodiments. For example, a first QR code in a dynamic QR code may be centered around an angle of 35°, and be scannable at a range of angles from 20° to 50°; while a second QR code in the same dynamic QR code may be centered around an angle of 50°, and be scannable at a range of angles from 40° to 60°.

The process flow diagram of FIG. 5 is not intended to indicate that the operations of the method 500 are to be executed in any particular order, or that all of the operations of the method 500 are to be included in every case. Additionally, the method 500 can include any suitable number of additional operations.

Figure 6A:
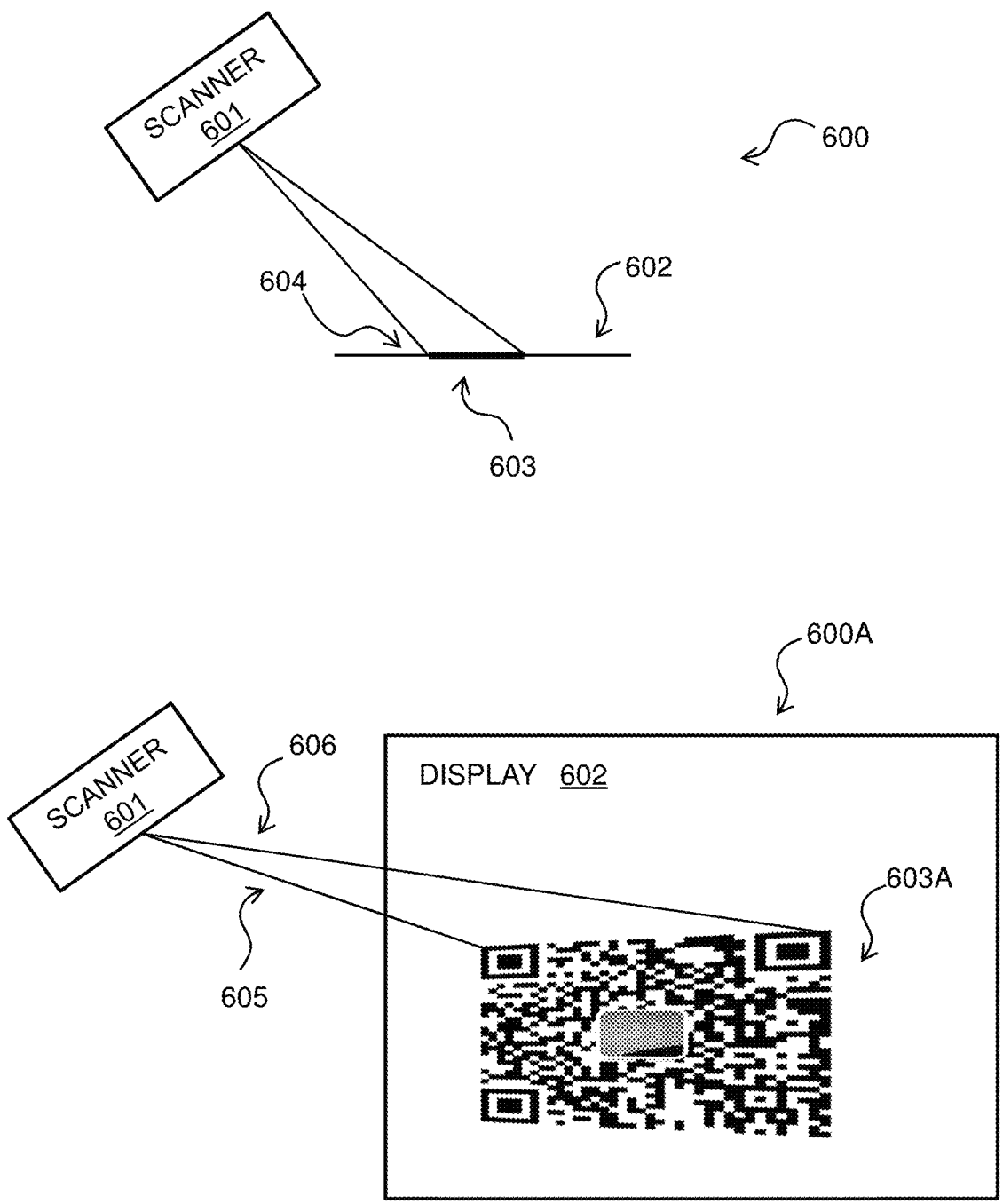
FIGS. 6A and 6B are block diagrams of example systems including QR code deformation.
Figure 6B:
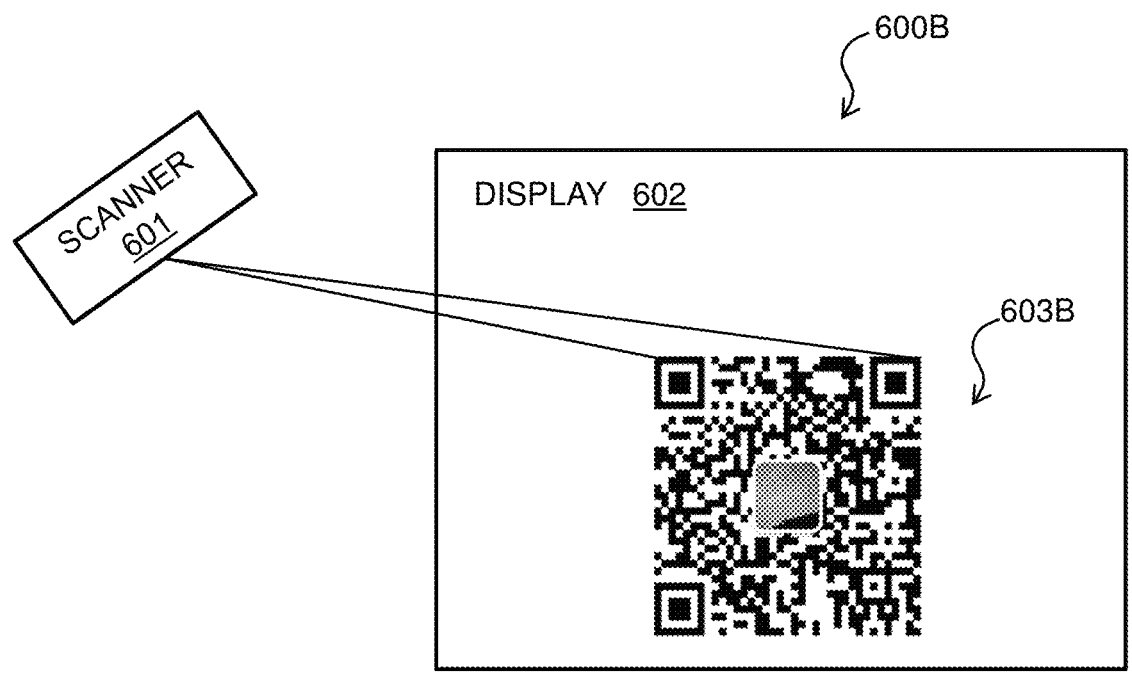
Figure 6B:
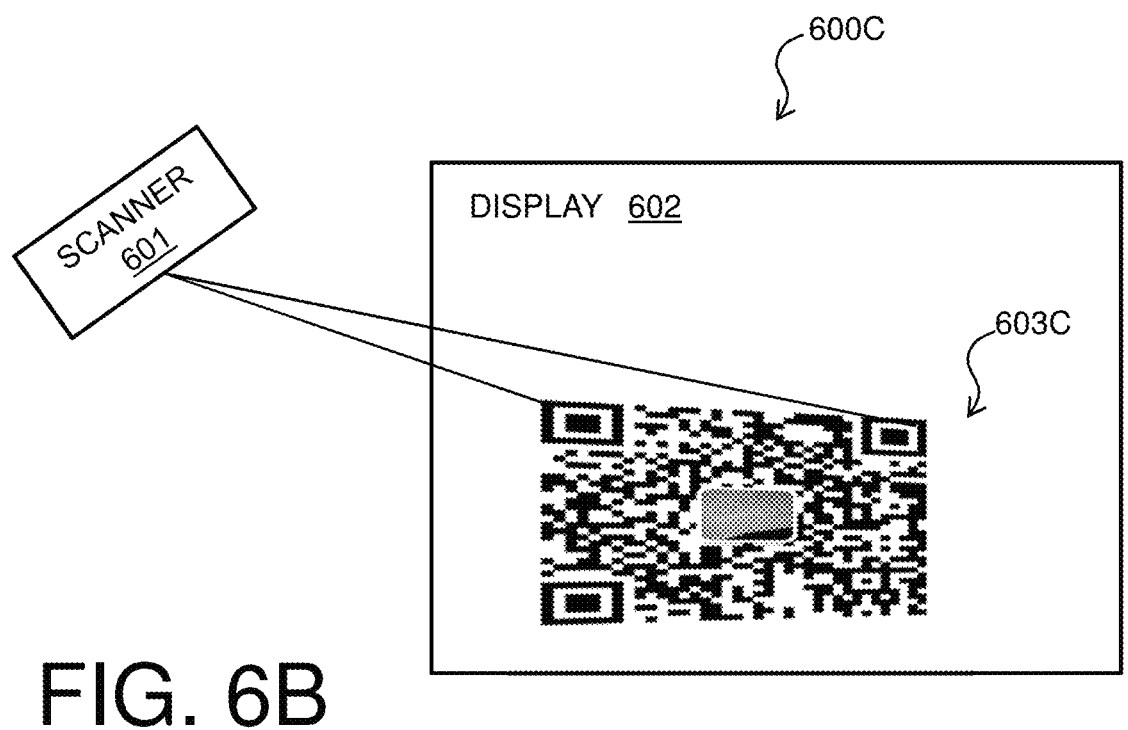

FIGS. 6A and 6B are block diagrams of example systems 600 and 600A-C for dynamic QR code display including QR code deformation. System 600 in FIG. 6A shows a side view of a scanner 601 that is at an angle 604 to a display 602 upon which a QR code 603 is displayed. Display 602 may correspond to display 119 of FIG. 1. QR code 603 may be a single deformed QR code in some embodiments; in other embodiments, QR code 603 may be a dynamic QR code that includes one or more deformed QR codes. System 600A illustrates an embodiment in which QR code 603 is a single deformed QR code that was generated based on an angle that corresponds to angle 604. Systems 600A-C together illustrate an embodiment of a dynamic QR code including a plurality of deformed QR codes 603A and 603C, and also undeformed QR code 603B. Deformed QR codes 603A and 603C may be generated based on QR code 603B using method 400 of FIG. 4. Each of systems 600A-C, as shown in FIGS. 6A and 6B, includes scanner 601 that is at an angle 604 to a QR code 603A-C on display 602.

In system 600A, as shown in FIG. 6A, a deformed QR code 603A is displayed on the display 602. The deformed QR code 603A includes a plurality of pixels that have been scaled (e.g., as described in method 400 of FIG. 4). The angle that deformed QR code 603A was generated based on is relatively close to the angle 604 to the scanner 601 as shown in system 600. Pixels on the left side of the deformed QR code 603A, which have a shorter distance 605 to the scanner 601, are smaller than the pixels on the right side of the deformed QR code 603A, which have a larger distance 606 to the scanner 601. Angle 604 is within a range of angles at which QR code 603A may be successfully scanned. System 600B of FIG. 6B shows the original, undeformed QR code, and the system 600C of FIG. 6B shows another deformed QR code 603C that was generated based on an angle that is supplementary to the angle 604 that was used to generate deformed QR code 603A of system 600A. In systems 600B and 600C, due to the angle 604 between the QR codes 603B or 603C and the scanner 601, the scanner 601 may not be able to successfully scan QR code 603B or 603C. A dynamic QR code including each of QR codes 603A-C displayed in series may be generated for display on the display 602, such that the scanner 601 may be located at a relatively wide range of angles from the display 602 and successfully scan at least one of the QR codes 603A-C that is displayed in series in the dynamic QR code.

In some embodiments, a single deformed QR code such as deformed QR codes 603A or 603C may be displayed on a display 602, or a deformed QR code such as deformed QR codes 603A or 603C may be displayed on any appropriate physical object for scanning by a scanner such as scanner 601. FIGS. 6A-B are shown for illustrative purposes only; a dynamic QR code may include any appropriate number of deformed QR codes, and the QR codes that make up a dynamic QR code may each be generated based on to any appropriate angle, in any appropriate manner.

The present techniques may be a system, a method or an apparatus. The flowchart and block diagrams in the Figures illustrate the architecture, functionality, and operation of possible implementations of systems, methods, and apparatus according to various embodiments of the present techniques. In this regard, each block in the flowchart or block diagrams may represent a module, segment, or portion of logic for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
receive a first quick response (QR) code, wherein the first QR code is scannable by a QR code scanner at a first range of angles;
determine a scanner angle, the scanner angle being outside of the first range of angles;
generate a second QR code based on the first QR code and the scanner angle, wherein the second QR code comprises a deformed QR code that is scannable by the QR code scanner at a second range of angles that is distinct from the first range of angles; and
determine a plurality of scanner angles, and, for each of the plurality of scanner angles, generate a respective deformed QR code.

2. The system of claim 1, wherein the processor is to:
generate a dynamic QR code comprising each of the respective deformed QR codes corresponding to the plurality of scanner angles.

3. The system of claim 2, wherein the dynamic QR code is displayed by displaying each of the respective deformed QR codes corresponding to the plurality of scanner angles in an animated series on a computer display.

4. The system of claim 1, wherein pixels in the second QR code are scaled based on a distance between each pixel and the QR code scanner based on the scanner angle.

5. The system of claim 4, wherein a first pixel in the second QR code that is determined to be closer to the QR code scanner is scaled to be smaller than a second pixel in the second QR code that is determined to be farther away from the QR code scanner.

6. The system of claim 1, wherein the scanner angle corresponds to an angle between the QR code scanner and a surface upon which the second QR code is displayed;
wherein the scanner angle is within the second range of angles; and
wherein the scanner angle is outside of the first range of angles.

7. A computer-implemented method, comprising:
receiving, by a processor, a first quick response (QR) code, wherein the first QR code is scannable by a QR code scanner at a first range of angles;
determining a scanner angle, the scanner angle being outside of the first range of angles;
generating a second QR code based on the first QR code and the scanner angle, wherein the second QR code comprises a deformed QR code that is scannable by the QR code scanner at a second range of angles that is distinct from the first range of angles; and
determining a plurality of scanner angles, and, for each of the plurality of scanner angles, generating a respective deformed QR code.

8. The computer-implemented method of claim 7, comprising:
generating a dynamic QR code comprising each of the respective deformed QR codes corresponding to the plurality of scanner angles.

9. The computer-implemented method of claim 8, wherein the dynamic QR code is displayed by displaying each of the respective deformed QR codes corresponding to the plurality of scanner angles in an animated series on a computer display.

10. The computer-implemented method of claim 7, wherein pixels in the second QR code are scaled based on a distance between each pixel and the QR code scanner based on the scanner angle.

11. The computer-implemented method of claim 10, wherein a first pixel in the second QR code that is determined to be closer to the QR code scanner is scaled to be smaller than a second pixel in the second QR code that is determined to be farther away from the QR code scanner.

12. The computer-implemented method of claim 7, wherein the scanner angle corresponds to an angle between the QR code scanner and a surface upon which the second QR code is displayed;
wherein the scanner angle is within the second range of angles; and
wherein the scanner angle is outside of the first range of angles.

13. A computer program product comprising:
a computer readable storage medium having program instructions embodied therewith, the program instructions executable by a processing device to cause the processing device to perform a method comprising:
receiving a first quick response (QR) code, wherein the first QR code is scannable by a QR code scanner at a first range of angles;
determining a scanner angle, the scanner angle being outside of the first range of angles;
generating a second QR code based on the first QR code and the scanner angle, wherein the second QR code comprises a deformed QR code that is scannable by the QR code scanner at a second range of angles that is distinct from the first range of angles; and
determining a plurality of scanner angles, and, for each of the plurality of scanner angles, generating a respective deformed QR code.

14. The computer program product of claim 13, the method comprising:
generating a dynamic QR code comprising each of the respective deformed QR codes corresponding to the plurality of scanner angles.

15. The computer program product of claim 14, wherein the dynamic QR code is displayed by displaying each of the respective deformed QR codes corresponding to the plurality of scanner angles in an animated series on a computer display.

16. The computer program product of claim 13, wherein pixels in the second QR code are scaled based on a distance between each pixel and the QR code scanner based on the scanner angle.

17. The computer program product of claim 16, wherein a first pixel in the second QR code that is determined to be closer to the QR code scanner is scaled to be smaller than a second pixel in the second QR code that is determined to be farther away from the QR code scanner.

* * * * *